Jan. 31, 1967  W. H. FENGLER  3,302,209
METHOD FOR PRODUCING MACHINE-TOOL-CONTROLLING
MAGNETIC TAPES DIRECTLY FROM DRAWINGS
Filed July 6, 1964
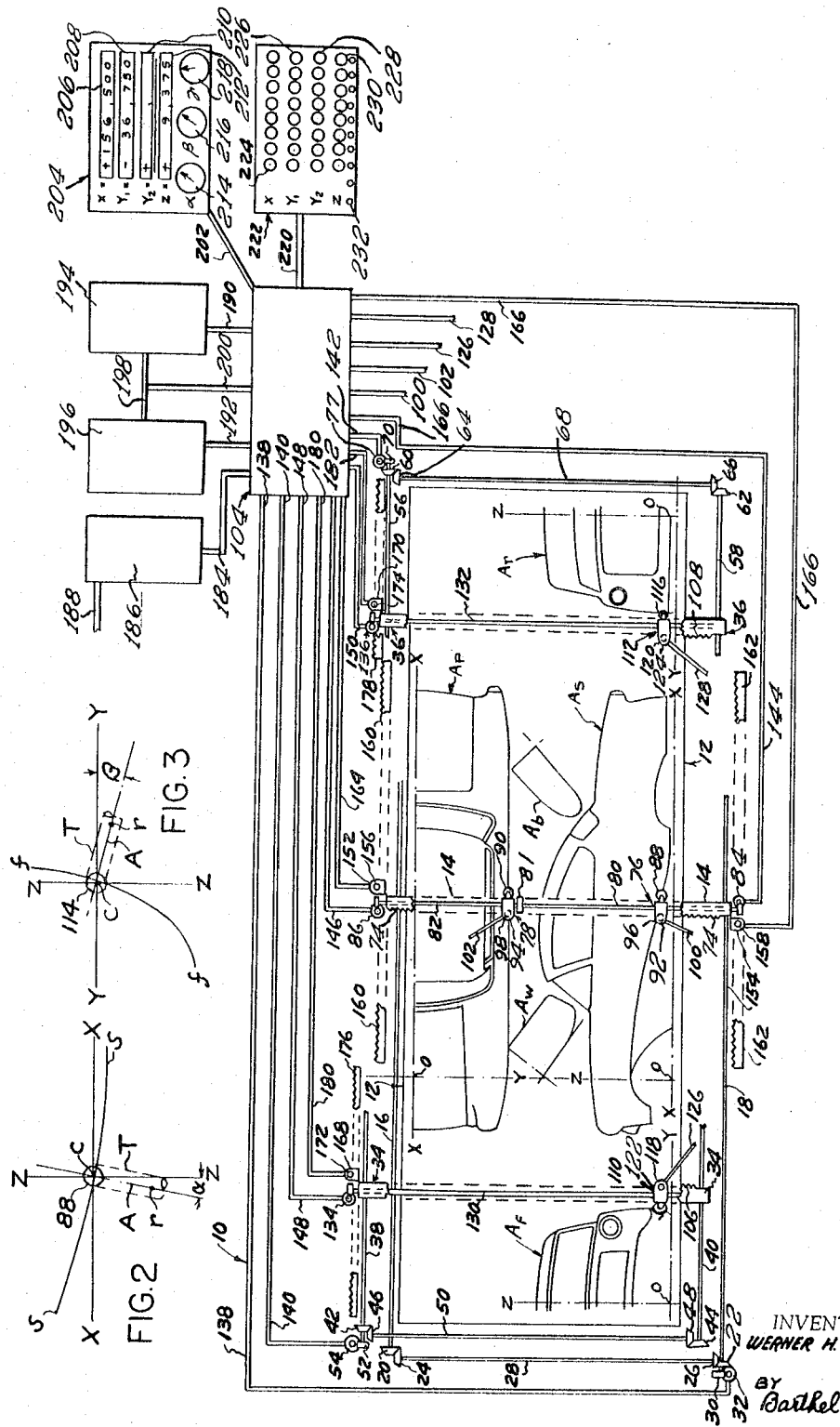
INVENTOR.
WERNER H. FENGLER.
BY
Barthel & Bugbe
ATTORNEYS.

United States Patent Office 3,302,209
Patented Jan. 31, 1967

3,302,209
METHOD FOR PRODUCING MACHINE-TOOL-CONTROLLING MAGNETIC TAPES DIRECTLY FROM DRAWINGS
Werner H. Fengler, 23651 Fordson Drive,
Dearborn, Mich. 48124
Filed July 6, 1964, Ser. No. 380,603
4 Claims. (Cl. 346—1)

This is a continuation-in-part of my copending application Ser. No. 340,983, filed Jan. 29, 1964 for Method and Apparatus for Producing Machine-Tool-Controlling Magnetic Tape Directly from Drawings, which on Apr. 13, 1965 became U.S. Patent No. 3,178,717.

This invention relates to tape-controlled machine tools and, in particular, to methods of producing the magnetic tapes which control the motions of such machine tools.

Hitherto, tape-controlled machine tools have been operated from perforated tapes or from magnetic tapes transforming the impulses recorded on such tape into feeding motions of the machine tool. Certain prior control systems for such machine tools have required the use of computers which interpolate the information prepared on punch cards into magnetic tape-recorded information which is again translated back to punched cards or tape which in turn is fed into the machine tool to precisely control the feeding motion of the cutting tool for a continuous path contouring cut. The present invention eliminates the need for the preparation of punch cards and dispenses with the use of computers for interpolation by sensing and converting the dimensions and directions of lines on working drawings of the part to be produced into three-dimensional feeding impulses recorded on a multichannel magnetic tape which is then fed into the machine tool and directly controls the feeding motion of the cutting tool thereof, assuring a smooth continuous path contouring cut.

Accordingly, one object of this invention is to provide a method of producing a machine-tool-control magnetic tape directly from an accurate large-scale drawing of the part or article to be produced by converting, into impulses recorded on a magnetic tape, the distances of a point moving along each line of the drawing as the "X" and "Y," or "X" and "Z" co-ordinates respectively measured from the intersection of the co-ordinates representing a starting, zero or reference position into impulses recorded in the channels of the tape, the tape thus produced being fed into a machine tool where the impulses on the tape are communicated to the cutting tool of the machine as corresponding intervals through which the tool is moved from a reference starting position or origin in directions corresponding to the coordinates of the tape-producing apparatus.

Another object is to provide a method of the foregoing character wherein the three-dimensional characteristics of the front, side and end elevational views and the top plan view of the part or article are translated into the "X," "Y" and "Z" coordinates of points traveling along instantaneously corresponding portions of the several views, the impulses corresponding to the position of each point being recorded in different channels of the tape corresponding to the different coordinates, the tape when fed into the machine tool feeding the machine tool by intervals corresponding to the impulses in the several channels of the tape so that the tip of the cutting tool is constantly and continuously positioned at a location on the workpiece corresponding to the "X," "Y" and "Z" coordinates, in three-dimensional space, of the corresponding points moving along the several views of the drawing, in the plane of the drawing.

Another object is to provide a method as set forth in the object immediately preceding, wherein the sensing device which follows the line of the particular drawing also measures and records on another channel of the tape the angle which a radius to the instantaneous curvature of the surface makes with a reference line, the information on the tape being translated in the machine tool into a tilt of the axis of the cutting tool corresponding to the angle of inclination of the radius, as represented by impulses required to move the axis from the reference line to the required inclination, thereby maintaining the cutting tool substantially normal to the surface to be machined and varying the inclination of the axis of the cutting tool as the surface curvature varies in order to maintain the cutting tool axis in this normal or perpendicular position.

Another object is to provide a method of the foregoing character wherein the automatic photo-electric line followers register the configuration of a line continuously and are so coupled electronically as to always scan the same line simultaneously in all views, and in the correct projection, each line follower generating continuously two axes of the coordinate system when following a line of the drawing.

Another object is to provide a method of the foregoing character wherein the recordation of the drawing dimensions in terms of impulses upon a multi-channel magnetic tape thereby establishes on the tape a permanent record of the surface configuration of the object represented by the different views in the drawing and consequently establishes a theoretical and accurate shell of the object in three-dimensional space while at the same time recording the compound angle in space of the normal to each point in the surface, thereby enabling the thus-produced multi-channel magnetic tape to be utilized immediately in a suitable magnetic tape-controlled machine tool, or stored for future production on such a machine tool, or utilized, with identical copies, to coordinate production of the same object or part in different locations in this or foreign countries, as well as to establish a faithful record of the configuration of the surface so recorded, which record may be stored in a safe place so as to enable the reproduction of that surface in the event of destruction of the factory, such as by nuclear attack.

Another object is to provide a method of the foregoing character wherein the machine-tool-control magnetic tape so produced may be used for the cutting of objects, models or parts of slightly larger or smaller sizes to provide a shrinkage or enlargement factor in the making of accurate castings of any specific material, the enlarged or reduced size objects corresponding in surface configuration in exact proportion to the original part of object as set forth in the various views of the drawing from which the magnetic tape was made but on a slightly enlarged or reduced scale.

Other objects and advantages of the invention will become apparent during the course of the following description of the accompanying drawing, wherein:

FIGURE 1 is a diagrammatic top plan view of a system for performing the method of the present invention, by converting the successive positions of corresponding points in the several views of a drawing of a part or article to be produced into impulses in the several channels of a magnetic tape corresponding to the coordinate positions of the points from rectangular reference co-ordinates on the drawing;

FIGURE 2 is a diagrammatic view showing the position required for the photo-electric line follower in making the magnetic control tape and also the position of the end mill for cutting the corresponding surface from the magnetic tape at the position in the side elevation in FIGURE 1 as shown in the position of the lower line follower in the lower central portion thereof; and FIGURE 3 is a diagrammatic view similar to FIGURE 2 but showing the corresponding positions of line follower and end mill in the front elevation of FIGURE 1, in the position of the line follower in the lower left-hand corner thereof.

Plotting board and carriage construction

Referring to the drawings in detail, FIGURE 1 shows an apparatus, generally designated 10, for recording the configuration of a part or article A upon a multi-channel magnetic tape for subsequent control of a machine tool (not shown). The article A is represented by properly aligned drawing views on a scanning board 12, these views being the top plan view A–p, side elevation A–s, front elevation A–f, rear elevation A–r, half windshield front projection A–w and half back window rear projections A–b. These several views are drawn in black lines upon a metal plate, such as sheet aluminum approximately $\frac{1}{16}$ inch thick which has previously been covered with a white coating, so as to provide the maximum contrast between the black line, which is approximately 4 or 5 thousandths of an inch wide against the white background to facilitate the operation of the optical line followers mentioned below. The alignment of the several views causes given points on any lines of the side elevation A–s to be immediately below the corresponding points on the corresponding lines of the top plan view A–p and immediately beside the corresponding points of the lines of the front and rear elevations A–f and A–r. The article A shown in these several views is illustrated as the drawing of an automobile body but the advantages of the invention are obviously not limited to automobile bodies but extend to any three-dimensional object which may be represented by such views. It may be necessary, however, to draw true views and sections in addition.

The scanning board 12 for reference purposes is provided with an origin "O" of three-dimensional rectangular coordinates selected according to an arbitrarily assumed arrangement, these arrangements differing with the particular company employing such layout systems. The system employed by one large automobile company locates the origin O for an automobile body drawing immediately below the mid-point of the front axle on the center line of the body. In the side elevation A–s, the X-axis O–X extends longitudinally of the automobile body coincident with the center line of the body, and the Z-axis O–Z extends perpendicularly to the X-axis O–X in a direction which in the actual article would be vertical. The distances to the left of the origin O in the side elevation A–s are considered minus and distances to the right of the origin O along the X-axis are considered plus. Distances upward along the Z-axis from the origin O are considered plus. In the example chosen, there are no distances downward from the origin O.

Considering the top plan view A–p in FIGURE 1, the X-axis O–X, as before, extends longitudinally of the article A coincident with its center line, whereas the Y-axis extends perpendicularly thereto in a direction which would be transversely of the automobile body selected as the article A, thus coinciding with the center line of the front axle. In this particular example, the article A is assumed to be symmetrical on opposite sides of the origin in both the top plan view A–p and end elevations A–f and A–r, hence only on half of the object A is illustrated. Thus, the "X," "Y" and "Z" axes define planes which are mutually perpendicular planes including the origin O. The relationship of the mutually perpendicular "Y" and "Z" axes relatively to the origin O are also shown in the front and rear end elevations A–f and A–r in FIGURE 1. Should occasion arise to have a different value of "Y" for the right-hand side than for the left-hand side, the values would be called "$Y_1$" for the right-hand and "$Y_2$" for the left-hand part.

Mounted for rectilinear guided movement above and along the scanning board 12 is a main bridge or carriage 14 which is propelled lengthwise of the scanning board 12 in the direction of the X-axis by parallel screw shafts 16 and 18 carrying bevel gears 20 and 22 meshing with corresponding bevel gears 24 and 26 on a cross shaft 28 so that the parallel screw shafts 16 and 18 will rotate in the same direction, for example, both clockwise to an observer looking from the left to the right at the left-hand end of FIGURE 1. The screw shaft 18 is also connected through reduction gearing 30 to an electric motor 32, the reduction gearing 30, for example, being worm gearing, so that the screw shafts 16 and 18 rotate slowly in the same direction by the more rapidly rotating motor 32.

Also mounted for rectilinear guided movement above and along the scanning board 12 independently of the main bridge 14 are auxiliary bridges or carriages 34 and 36. The auxiliary bridge 34 is propelled in the direction of the X-axis along the plotting board 12 by a pair of parallel screwshafts 38 and 40 carrying bevel gears 42 and 44 respectively which mesh with bevel gears 46 and 48 on the opposite ends of a cross shaft 50 in such a manner that the screwshafts 38 and 40 rotate in the same direction at the same speeds. The screwshaft 38 is connected through reduction gearing 52 to an electric motor 54 in a manner similar to that described for the screwshaft 18 and motor 32. The auxiliary bridge 36 is propelled in the direction of the X-axis along the scanning board by a pair of parallel screwshafts 56 and 58 carrying bevel gears 60 and 62 respectively which mesh with bevel gears 64 and 66 on the opposite ends of a cross shaft 68 in such a manner that the screwshafts 56 and 58 rotate in the same direction at the same speeds. The screwshaft 56 is connected through reduction gearing 70 to an electric motor 72 in a manner similar to that described above.

Line-following and motion-transmitting arrangement

Mounted on the main bridge or carriage 14 and extending from end to end thereof is a precision toothed rack 74 (FIGURE 1). The main bridge or carriage 14 serves as a guideway for an elevation cross carriage 76 and a plan cross carriage 78 operating on opposite halves of the main bridge 14 to travel back and forth therealong propelled by two screwshafts 80 and 82, each extending from the outer end of the main bridge or carriage 14 toward one another to a bearing block 81 located near the approximate midportion of the main bridge 14 but providing adequate travel of the cross carriages 76 and 78 over their respective views A–s and A–p. The screwshafts 80 and 82 are rotated independently of one another by electric speed-reducing motors 84 and 86 respectively and the cross carriages 76 and 78 are internally-threaded to be moved back and forth along their respective screwshafts 80 and 82 in response to the rotation thereof by the motors 84 and 86. Mounted on the elevation cross carriage 76 and plan cross carriage 78 are elevation and plan optical-electronic line followers or contour followers 88 and 90 respectively of conventional construction including a scanning device and a sensing head. Such an optical-electronic line or contour follower with a scanning device and the necessary electrical circuit and components, for example, were described in an illustrated article by T.M. Berry entitled "Optical Contour Follower" in the June 1950 issue of the General Electric Review published by the General Electric Company at Schenectady, N.Y. and further described in a pamphlet No. GEC 548 entitled "G. E. Contour Following System" under No. 8851 published in June 1949, November 1949 and August 1950 by the Apparatus Department of the General Electric Company, Schenectady, N.Y. Briefly described, it consists of a microscope objective and rotary Dove prism system focussed on a photo-electric device. This line follower scans the line L on the drawing D and by balancing the image density on opposite sides of the line maintains a position with its center traveling directly above the line, with a self-correcting action which brings it back to the line whenever any tendency to stray from the line develops.

Also mounted on the elevation and plan cross carriages 76 and 78 are pinions 92 and 94 (FIGURE 1) meshing with the teeth of the rack 74 and mounted on the input shafts of elevation and plan synchro-transmitters 96 and 98 respectively, in such a manner that the motion of the cross carriages 76 and 78 and their particular positions at any instant on the main carriage or bridge 14 are transmitted by the synchro-transmitters 96 and 98 operated by their respective pinions 92 and 94 as the latter roll along the toothed rack 74. The motion and position signals transmitted by the synchro-transmitters 96 and 98 are carried by flexible cables 100 and 102 respectively to a junction panel, generally designated 104, from which interconnection is made to other parts of the circuit, as described below.

In a similar manner, the auxiliary bridges or carriages 34 and 36 are provided with precision racks 106 and 108 and also guideways for optical-electronic front and rear line follower cross carriages 110 and 112 respectively carrying conventional line followers 114 and 116 respectively similar to the line followers 88 and 90 described above and similarly provided with pinions 118 and 120 meshing with the racks 106 and 108 and mounted on the input shafts of synchro-transmitters 122 and 124. These in turn are connected by flexible electric cables 126 and 128 running to the junction panel 104.

Like the cross carriages 76 and 78 the end view cross carriages 110 and 112 are propelled to and fro along their respective auxiliary bridges or carriages 34 and 36 by being internally-threaded to engage correspondingly-threaded rotary screwshafts 130 and 132 respectively. The screwshafts 130 and 132 are journaled in their respective cross-carriages 34 and 36 and rotated by speed-reducing motors 134 and 136 respectively. The speed-reducing motors 32, 54 and 72 which move the main carriage 14 and auxiliary carriages 34 and 36 along the plotting board 12 are connected by conductor cables 138, 140 and 142 to the junction panel 104 for their control and energization. The speed-reducing motors 84, 86, 134 and 136 for moving the cross carriages 76, 78, 110 and 112 respectively along their respective main and auxiliary carriages 14, 34 and 36 are connected by conductor cables 144, 146, 148 and 150 respectively to the junction panel 104 for their control and energization.

The motions and distances of travel of the main bridge or main carriage 14 along the scanning board 12 are measured off from the origin O by synchro-transmitters 152 and 154 mounted on opposite ends of the main carriage 14 and having input shaft pinions 156 and 158 meshing with and rolling along the stationary racks 160 and 162 mounted parallel to the X-axis. The synchro-transmitters 152 and 154 are in turn connected by multi-conductor electric cables 164 and 166 to the junction panel 104. Should both synchro-transmitters not measure the same distances from O, thereby indicating a misalignment of the bridge, the signals will show up an error, either stopping the operation or correcting the windup of the long screws. Similarly, the auxiliary bridges or carriages 34 and 36 carry synchro-transmitters 168 and 170 which measure off their motions and distances of travel along the X-axis from the origin O. The synchro-transmitters 168 and 170 are also provided with input shaft pinions 172 and 174 which mesh with and roll along stationary racks 176 and 178 mounted parallel to the X-axis of scanning board 12. The synchro-transmitters 168 and 170 are connected by multi-conductor cables 180 and 182.

Connected in circuit with the junction panel 104 by the multi-conductor cable 184 is an electric power supply and control cabinet 186 which, as its name indicates, controls the electric power entering it from commercial electric power mains 188 to the remainder of the circuit. Connected to the junction panel 104 by multi-conductor cables 190 and 192 are a plotting board tape-recorder 194 and a styling bridge tape-recorder 196 respectively, these being connected to one another by a multi-conductor cable 198 which in turn is connected to the junction panel 104 by a multi-conductor cable 200. The scanning board tape recorder 194 records upon multiple channels of a magnetic tape, the impulses corresponding to and measuring the distances traveled by the main and auxiliary bridges or carriages 14, 34 and 36 from their respective origins O along the X-axis, and also corresponding to and measuring the distances traveled by the line follower carriages 94, 96, 110 and 112 in directions transverse to the scanning board 12 in the directions from the origin O of the "Y" and "Z" axes respectively. Also connected to the junction panel 104 by a multi-conductor cable 202 is a position readout indicator 204 which indicates visually to the operator, in a manner similar to an electrical revolution counter, the instantaneous displacements, measured by impulses of the point at a particular instant on the various corresponding lines of the different views A–$p$, A–$s$, A–$f$, and A–$r$ from the origin O along the X, Y and Z axes in windows 206 for the X-axis, 208 and 210 for the Y-axis and 212 for the Z-axis.

Finally, the indicator 204 is also provided with dials 214, 216 and 218 which at any instant indicate the angle alpha, beta and gamma designating the position in angular and polar coordinates of the instantaneous perpendicular to the point on the curved line being followed by the line followers 88, 90, 114 and 116 respectively and aligned with them at the particular instant. These angles will represent the angles at which the rotary milling tool of the milling machine to be controlled by the magnetic tape will be commanded by the tape to assume relatively to the curved surface of the work being machined, as explained more fully below, so that a flat-ended milling cutter will always machine the work without digging into the work upon one side, as would be the case if its axis of rotation were not perpendicular to a plane a tangent through the point of contact or, in other words, if the axis of rotation were not radial to the surface at the point of contact. The inclination of the radius at the point of contact would vary from point to point if the surface as a whole being machined were not spherical but varied in curvature. Each point, however, can be considered as having a definite radius of curvature and therefore a definite radius at the point of contact at any particular instant. The point of contact of the axis of rotation of the cutter is defined by the X–Y–Z coordinates.

Also connected by a multi-conductor cable 220 to the junction panel 104 is a manual positioning control panel, generally designated 222, having four rows of windows 224, 226, 228 and 230 and a fifth row of pushbuttons and manual control knobs 232. The rows of windows 224, 226, 228 and 230 reveal numbers indicating the displacement of any point on the scanning board 12 represented in steps along the X-axis, the two opposing directions along the Y-axis and along the Z-axis respectively from the origin coordinates O, as obtained when the pushbuttons and knobs 232 are operated manually to move the main and auxiliary bridges of carriages 14, 34 and 36 to any desired starting point from which automatic line following is to commence. In this manner, the operator is able to move the line followers 88, 90, 114 and 116 manually into alignment.

In one embodiment of the invention, the motor shafts which propel the main auxiliary bridges or carriages 14, 34 and 36 and the line follower cross carriages 76, 78 and 110, 112 thereon and the electrical components thereof have been so chosen that each impulse represented on the magnetic tape produced by the apparatus shown in the figure represents a given angle of rotation, for instance 18 degrees, if so selected, of the particular motor shaft or 30 such impulses or steps for each revolution of the motor shaft, which in turn represents a linear motion of $\frac{1}{100}$ of an inch on an axis. This in turn corresponds to a linear motion of half of $\frac{1}{1000}$ of an inch or five-thousandths of an inch per impulse. Thus, the system of the present invention provides two corrective steps per one-thousandth of an inch linear motion. The machine tool in which the magnetic tape produced by the present invention is mounted is preferably provided with identical drive motors to actuate its various feeding motions and each impulse on the magnetic tape produces one step, or 1.8 degrees, if so selected, of rotation of the machine tool drive motor which in turn through suitable ratio of gearing drives the fed shafts so as to move the cutting tool one-half of $\frac{1}{1000}$ of an inch per step in the same manner as described above with respect to the production of the magnetic tape in the apparatus of FIGURE 1. In other words, 2000 impulses or steps correspond to one inch of linear travel of the various line followers and of the cutting tool of the ultimate milling machine or other machine tool controlled by the magnetic tape produced by the apparatus 10.

In the foregoing specification, the details of construction, circuits, and operation of the synchro-transmitters and receivers have been omitted because these devices are conventional and their details are well known to electrical engineers skilled in servo-systems, hence are beyond the scope of the present invention. A description of the details of construction, wiring and operation of such servo devices is given, for example, in the well-known book "Servomechanism Fundamentals" by Lauer, Lesnigh and Matson published by McGraw-Hill Book Co., New York, first edition 1947, following page 26 therein.

*Operation*

In performing the method of the invention, let it be assumed that the necessary multi-channel magnetic tapes have been installed in the tape recorders 194 and 196 and that the various line follower carriages 76, 78, 110 and 112 have been moved to their desired starting points on the lines of the views A–p, A–s, A–f and A–r on the scanning board 12. How this is accomplished has been described immediately above, the motion along the X, Y and Z axes accomplished by operating the pushbuttons and knobs 232 of the manual positioning control panel 222. Thereupon the windows 224, 226, 228 and 230 indicate the resulting travel, measured in numerical steps or impulses of the above-named line followers and their carriages to the desired starting points on the selected line of the respective views of the drawing on the scanning board 12. The drawings, drafts or lofts are very seldom completed in all views by the average draftsman. Therefore, a means has been provided by arranging the circuits in such a manner that a line shown in two views can be recorded on a separate tape. For this purpose, the styling bridge tape recorder 196 was provided. From these recorded impulses a stylus, which replaces the optical follower, is drawing the line in the view in which the draftsman omitted it.

Also by a proportionate network and circuitry, all such lines are drawn which interpolate and respectively "develop" the surface between two given sections, thereby lightening the load on the draftsman who need only define so-called "master sections" between "design lines," moldings or so-called "high-light lines" of warped surfaces.

Should lines lie on top of each other or be so close to each other that the line follower has difficulty in following them, they can be spread on the plotting board on the drawing, by relocating through an input on the console the zero setting for the particular grid line controlling the line in space. After all surface development lines have been drawn, and the operator is ready to record the tape which will be controlling the milling machine, he will position three of the four electric line followers on the starting point in each view of the line to be cut into a model through the required inputs on the console. If all required line followers pick up the line and the position indicators agree, the operator then switches to automatic operation by actuating the appropriate pushbuttons or knobs in the row 232 on the manual control panel 222, whereupon the line followers 88, 90, 114 and 116 commence to move automatically along the selected lines of their respective drawing views A–p, A–s, A–f and A–r. This motion in turn causes their respective line follower carriages 76, 78, 110 and 112 and the main and auxiliary carriages 14, 34 and 36 to move in mutually perpendicular directions by the synchro systems for controlling their respective operating motors 32, 53 and 74 for moving the main carriage 14 and the auxiliary carriages 34 and 36 along the scanning board 12 in the X-axis direction and the line follower operating motors 34, 36, 134 and 136 for moving the line follower carriages 76, 78, 110 and 112 respectively in a transverse direction along the Y or Z-axes, as the case may be.

At the same time, two of the three line followers used traversing either the front or rear elevation views A–f and A–r or the plan view or side elevation A–r or A–s automatically indicate the angle of the perpendicular to the point scanned at any given instant, thereby determining the angles alpha and beta which approach the angle of the end mill in the milling machine to be controlled by the magnetic tape which it must assume in order to properly machine the surface. These angles are indicated in FIGURES 2 and 3 and automatically determine the third angle gamma, all of these angles being registered on the dials 214, 216 and 218 as the operation of the apparatus 10 proceeds. Meanwhile, the operation of the various synchro-transmitters 152 and 154 for the main carriage 14; 172 and 174 for the auxiliary carriages 34 and 36 respectively; 96 and 98 for the main line follower carriages 76 and 78 respectively; and 122 and 124 for the auxiliary line followers 110 and 112 respectively, transmits the distances traveled in terms of steps which are indicated numerically in the windows 206, 208, 210 and 212 of the position readout indicator 204. At the same time, the impulses or steps are being recorded on the multi-channel magnetic tapes in the tape recorders 194 and 196 in the form of impulses corresponding to the numerical steps indicated on the position readout indicator 204.

When one line of the drawing has been thus traced or scanned and the various coordinates of each point therealong have been registered on the magnetic tape channels in terms of impulses or steps from the starting point, the operator then repeats the foregoing operation for each line of the drawing which is intended to control the cutting operations of the ultimate machine tool to be controlled by the magnetic tape thus produced, until a complete set of instructions has been recorded on the magnetic tape. Other channels of the magnetic tape also record rotational speed of the cutting tool, type of cutter, change of length of cutter, angular relationship of the cutter to the X, Y, Z coordinate system as indicated by the angles alpha, beta and gamma mentioned above. The remaining channels of the conventional fourteen-channel magnetic tape may carry verbal instructions to the operator of the machine tool relative to positioning the work on the platform of the machine tool and related information deemed necessary. The speed of the tape being read by the machine will indicate the speed of the feeding motions in "true time."

The description of the conventional drives consisting of motors, gear reductions and turning screws pushing stationary nuts has been selected to simplify the description of the apparatus. It may well be, if so desired, that instead as an alternate a stationary screw is located on each side of the scanning board 12 and along each carriage base, held rigidly at each end. A revolving nut driven by a gear reduction and a motor would move the carriages and saddles equally well yet minimize the unavoidable wind-up of the long screws.

FIGURES 2 and 3 show diagrammatically the geometrical relationship which must exist in making the magnetic control tape according to the present invention and in subsequently using it to control the position of a cutting tool, such as an end mill T, at any instant at corresponding points on a given drawing line s—s and f—f in the side elevation A–s and front elevation A–f respectively. It will be understood by those skilled in the optical contour follower art as referred to above in the atricle by T. M. Berry in the June 1950 issue of the General Electric Review entitled "Optical Contour Follower" that the photo-electric cell of each line follower 88 or 114 is mounted on the outer end of a swinging arm A pivoted at r in FIGURES 2 and 3, whereas the optical centers of the line followers 88 and 114 respectively are located at c on the ends of the arms A in coincidence with the lines s—s and f—f being followed. The angle "alpha" in FIGURE 2 between the arm A of the line follower 88 and the Z-axis indicates the instantaneous position of the arm A on the instantaneous radius of the line s—s in making the magnetic control tape and also indicates the corresponding instantaneous position of the axis of the rotary cutting tool, such as an end mill, in cutting a surface whose contour corresponds to the drawing line s—s. Similarly, FIGURE 3 indicates the angle beta between the arm A of the line follower 114 on the instantaneous radius of the line f—f and the Y-axis at the same instant in the front elevation A–f which is also the corresponding position of the rotary cutting tool T, such as an end mill in cutting the contour of the surface whose contour at the same instantaneously corresponding point is indicated by the line f—f. The remaining angle gamma is determinable when the angles alpha and beta are known.

From the foregoing description is will be seen that each of the above-mentioned automatic optical line followers generates continuously two axes of the coordinate system, when following a line. For instance, the line follower 90 following the plan view A–p will generate coordinates for the X and Y axes, whereas the line follower 88 in the side view A–s will generate the X and Y axes. Since these line followers are electrically and mechanically coupled so that at each instant one axis is common to two line followers, this coordinates automatically the reading of two lines in two different views, exactly and simultaneously on corresponding points and in the correct projection. Moreover, the line followers 114 and 116 for the front and rear views A–f and A–r respectively double-check these coordinates and register any errors or discrepancies which the draftsman may have made in making the original drawings. For example, should any line be found in this manner to be missing or misdirected, so that the surface being produced does not fair smoothly into the adjacent one, it can be redrawn automatically by substituting a scriber for the particular line follower where the error or omission has occurred. Thus, the method of the present invention is useful as providing, in effect, automated drafting and greatly aids the draftsman in making perfect projections in all views of the object or part by enabling the automatic drawing of the third view from any two given views.

It will also be seen from the foregoing description that the continuous sensing and recording on the magnetic tape of the compound angle which the normal makes to each instantaneous point of the surface enable the combining of the projected angles of two views to determine the true compound angle thereof in space and thus permit finishing the surface of the workpiece in the magnetic-tape-controlled machine tool by the use of flat end mills to closer tolerances than is possible with the round-nosed end mills presently used in conventional numerically-controlled continuous-path contour milling. The part being produced can be made exactly—proportionately larger or smaller to provide a predetermined enlargement or shrinkage factor, such as for the making of accurate castings from particular material or for producing parts which cover other parts, such as scuff plates.

A magnetic-tape-controlled machine tool which is suitable for use with and controlled by the magnetic tape produced by the method of the present invention is disclosed and claimed in my co-pending application Serial No. 365,239, filed May 6, 1964 for Analog Magnetic-Tape-Controlled Machine, which on Jan. 25, 1966 become U.S. Patent No. 3,280,836. It will be understood of course that such a machine will be equipped with identical drives corresponding to the drives used in making the magnetic tape, so that the electrical signals impressed on the magnetic tape from the scanning of the corresponding lines in the various views of the drawing by the present method will be faithfully transmitted to the cutting tool in the machine. It will be evident, moreover, that corrections can be made in one portion or in any channel of the magnetic tape without altering other portions of the tape. Furthermore, if for any reason the draftsman is unable to draw the lines of all the required cutter paths necessary for the production of the part by the machine, the machine can be equipped with a simple analog computer circuit capable of interpolating between two design section lines so as to subdivide the area between these lines into the necessary small increments. This interpolation consists of a surface development between two given and designed surface cross-sections, using the triangulation method and the same magnetic tape.

In summation, it is reiterated that the method of the present invention controls the cutter path of an end mill directly from the lines in the various views of a draft or drawing of the part or object to be produced. Due to the direct and electronic coupling of the automatic optical line followers employed in following the lines of the three or more views of the drawing, these respond continuously and instantaneously, so that there is no need, as heretofore required, to create computer-generated drawing lines or for manually taking the coordinates of a line, step-by-step or for the use of human "programming," as required by previous automated drafting machine systems. Moreover, there is no need for developing a special "machine language" as in other systems, because the system of the present invention remains within the geometric drafting language used universally in all parts of the world. It will also be evident that the method of the present invention is useful, not only with a rectangular coordinate system as above described but also with a special polar-coordinate vectorial system in which the constantly-changing angle of the vector and its length is recorded upon the magnetic tape in terms of impulses, as above described.

In conclusion, the method of the present invention eliminates the following steps required in previous numerically controlled machine tool systems:

(a) Registering the coordinates of a line in small increments.

(b) Translating these coordinates into a process program by a "programmer."

(c) Using a computer to find the intermediate points and portions of the drawn line in order to form a continuous cutter path.

(d) Using the computer to find the required offset of the round-nose cutter path in order not to cut into the surface wanted.

(e) Translating the computer output into a usable punched tape for numerically-controlled machine tools.

(f) Verifying the tapes in order to eliminate the human errors along all required steps.

(g) Hand finishing the surface required to smooth out, by hand, the ridges left on the workpiece by the round-nose end mill.

(h) Inspecting the finished surface after such hand-finishing operation.

What I claim is:

1. A method for producing, directly from a line drawing containing aligned plan and elevational views in three mutually-perpendicular planes representing the three-dimensional appearance of an article, a multi-channel magnetic tape for automatically controlling the feeding motions of a machine tool cutter simultaneously in the three dimensions so as to reproduce the article, said method comprising inscribing on said drawings origins of coordinates and rectangular reference coordinate axes extending in mutually perpendicular directions from said origin on said drawing, simultaneously scanning and sequentially measuring the distances from said coordinate axes to instantaneously-corresponding minutely-separated points along corresponding lines of said views in terms of the number of electric impulses of a predetermined frequency accumulating during the scanning intervals from said coordinate axes to the respective corresponding points on said lines, and simultaneously impressing said impulses upon separate parallel channels of the magnetic tape, the number of impulses corresponding to the distances of the points on each drawing line from a given coordinate axis being impressed upon a channel of said tape assigned thereto.

2. A method of producing a magnetic machine-tool-control tape directly from the several views of an article drawing according to claim 1, whereby the points on the drawing lines in the end elevational view are scanned separately and their distances thereby measured in terms of impulses from different coordinate axes extending from a different origin than those in the side elevational and plan views of the article, and wherein the impulses resulting from scanning the end elevational view of the article are imposed upon a different tape channel than the impulses resulting from scanning the side elevational and plan views of the article.

3. A method of producing a magnetic machine-tool-control tape directly from the several views of an article drawing, according to claim 1, wherein such scanning and measurement is carried out simultaneously by independent scanning travel in mutually perpendicular directions along corresponding drawing view lines for obtaining measurements of the distances of such corresponding points along such corresponding lines from such coordinate axes in terms of such impulses and impressing such impulses upon said tape.

4. A method of producing directly from a drawing containing aligned plan and elevational views of an article, a multi-channel magnetic tape for automatically controlling the feeding motions of a machine tool cutter to reproduce the article, said method comprising inscribing rectangular reference coordinate axes on said drawing, simultaneously scanning and sequentially measuring the distances from said coordinate axes to instantly-corresponding minutely-separated points along corresponding lines of said views in terms of the number of electric impulses of a predetermined frequency accumulating during the scanning intervals from said coordinate axes to the respective corresponding points on said lines, impressing said impulses upon the magnetic tape, scanning and sequentially measuring the angles of inclination relatively to said coordinate axes of the instantaneous radii of curvatures of said drawing lines in terms of such electrical impulses, and impressing said angular measurement impulses upon other channels of said tape whereby to control the angles of inclination of the machine tool cutter axes relatively to work during the subsequent machining operations.

References Cited by the Examiner

UNITED STATES PATENTS

| | | | |
|---|---|---|---|
| 2,714,253 | 8/1955 | Stone | 33—18 |
| 2,916,342 | 12/1959 | Neergaard | 346—33 X |
| 3,032,881 | 5/1962 | Fengler | 33—23 |
| 3,072,833 | 1/1963 | Kerr et al. | 318—162 |

RICHARD B. WILKINSON, *Primary Examiner.*

J. W. HARTARY, *Assistant Examiner.*